United States Patent [19]

Moxness

[11] Patent Number: 4,884,251

[45] Date of Patent: Nov. 28, 1989

[54] HOUSING FOR A SONIC TRANSDUCER

[75] Inventor: James G. Moxness, St. Paul, Minn.

[73] Assignee: Minnesota Minning and Manufacturing Company, St. Paul, Minn.

[21] Appl. No.: 342,756

[22] Filed: Jan. 26, 1982

[51] Int. Cl.[4] ...................... H04R 11/00; A47B 81/06; G01K 11/00

[52] U.S. Cl. .................................... 367/188; 367/905; 181/198; 181/192

[58] Field of Search ............... 367/188, 140, 151, 905; 181/198, 175, 155, 150, 151, 191, 185, 192, 195, 187; 310/335; 343/786, 781 R

[56] References Cited

U.S. PATENT DOCUMENTS 2,823,365 2/1958 Rines .
2,827,620 3/1958 Batchelder .
2,861,646 11/1958 Kock .
2,943,296 6/1960 Fryklund .
3,109,155 10/1963 Degen ................................ 367/151
3,319,220 5/1967 Massa, Jr. .
3,351,901 11/1967 Padberg, Jr. .
3,396,366 8/1968 Midlock et al. .
3,451,260 6/1969 Thurstone .
3,559,747 8/1971 Hanson et al. .................. 181/0.5 A
3,599,747 8/1971 Hanson et al. .
3,742,442 6/1973 Leyde et al. ........................ 367/191
3,760,345 9/1973 Hughes .
3,783,967 1/1974 Apgar .
3,864,666 2/1975 Douglas .
3,912,954 10/1976 Baird .
3,970,879 7/1976 Kumon .
3,982,142 9/1976 Goble .
4,146,869 3/1979 Snyder .
4,264,788 4/1981 Keidel et al. ........................ 367/905
4,274,421 6/1981 Dory .
4,300,217 11/1981 Ballinger .
4,348,750 9/1982 Schwind ............................ 181/155

*Primary Examiner*—Thomas H. Tarcza
*Assistant Examiner*—Gregory C. Issing
*Attorney, Agent, or Firm*—Donald M. Sell; Walter N. Kirn; William D. Bauer

[57] ABSTRACT

A housing adapted for receiving a sonic transducer capable of projecting and receiving a sonic pattern having a primary lobe and a secondary lobe. The housing has an end wall for receiving the sonic transducer and a restrictive wall for intercepting the secondary lobe of the sonic pattern in one quadrant and reflecting that portion of the secondary lobe into the opposite quadrant. A pair of side walls substantially intercept and reflect the secondary lobe in quadrants adjacent the one quardant to provide more uniform sonic pattern. The side walls may be disposed at an angle outward from the direction of projection of the primary lobe having a value of from 0.2 to 0.3 of the value of the angle the secondary lobe makes with the primary lobe.

17 Claims, 4 Drawing Sheets

HOUSING FOR A SONIC TRANSDUCER

BACKGROUND OF THE INVENTION

The present invention relates generally to a housing for a sonic transducer and more particularly to a housing for an ultrasonic transducer utilized in a echo-ranging object detection system.

Sonic transducers, and particularly ultrasonic transducers, have been utilized in a variety of echo-ranging object detection systems. In a typical system, the transducer will transmit a sonic pattern into a surveillance area. If an object is present, the sonic pattern (wave form) will be reflected back to the transducer. That same transducer, or a second one, can then signal the perception of a sonic pattern to indicate the presence of the object in the surveillance area. The reception may be signalled based upon either the strength or upon the timing of the signal received.

A typical sonic, and particularly an ultrasonic, transducer produces a sonic pattern in the form of a primary lobe and a secondary lobe. The primary lobe is projected out in a primary direction and covers a certain area around that primary direction. A secondary lobe is projected at an angle to the primary direction surrounding the primary lobe. Since the secondary lobe is projected at an angle surrounding the primary lobe, the coverage of the combined sonic pattern will not be uniform at a given distance from the transducer. The combined sonic pattern will have a center coverage area formed by the projection of the primary lobe and a donut-shaped coverage area formed by the secondary lobe surrounding the center coverage area. There may be a space or area between these coverage areas which will not receive this sonic pattern.

The typical sonic transducer utilized in an echo-ranging object detection system would produce a non-uniform coverage. If an object is present in the surveillance area where the sonic pattern is impinging, it would provide a reflection of that sonic pattern. However, if an object were present in the surveillance area where the sonic pattern is not impinging, it cannot, of course, reflect the sonic pattern back to the sonic receiver. The sonic receiver may be either the same transducer as the projecting transducer or it may be a second transducer.

Further, the object may be present in the surveillance area where the sonic pattern impinges upon the object, but the object may be slightly angled with respect to the transducer such that it might reflect that sonic pattern, not exactly back to the transducer. This reflection would be missed by the receiving transducer without a suitable housing collecting or focusing the sonic pattern back to the receiving transducer.

One installation of an echo-ranging object detection system utilizing a transducer is a system to detect the presence of automobiles. A typical example would be a system to detect the presence of an automobile at a location not visible to an interested party. An example would be a drive-up ordering station (menu) at a fast food restaurant.

A typical problem at such installation is unwanted false returns. The false returns may be from ground clutter, such as pebbles on a roadway, from snowbanks, or from channelization curbs, for example. The echo-ranging object detection system in this type of installation should restrict the area of coverage in one zone or quadrant (typically the bottom quadrant), to shield out unwanted false returns.

An outdoor installation accessible to the public may also need to be physically protected. The system may be shielded from the elements to protect the transducer and other vulnerable parts of the system from rain, snow, sleet, etc. The system may also be shielded from unwarranted physical intrusion as by vandalism, blowing debris and small animals, for example.

SUMMARY OF THE INVENTION

The housing of the present invention receives or mounts a transducer to solve these problems. The housing simultaneously will restrict the area of coverage in one quadrant while making coverage in adjacent quadrants more uniform than would be possible without the housing. The housing also protects the transducer and other critical elements from physical elements and from physical intrusion.

The housing has an end wall adapted for receiving the sonic transducer. A restrictive wall is coupled to the end wall. The restrictive wall is for intercepting the secondary lobe of the sonic transducer in a first quadrant and reflecting the secondary lobe into a quadrant opposite the first quadrant. Further, a pair of side walls are coupled to the end wall and to the restrictive wall. The paid of side walls substantially intercept and reflect the secondary lobe in quadrants adjacent the first quadrant to provide a more uniform sonic pattern in the quadrants adjacent the first quadrant.

In the preferred embodiment the pair of side walls of the housing are disposed in an angle outward from the primary direction of projection of the primary lobe at an angle having a value of from 0.2 to 0.3 of the value of the angle which the secondary lobe makes with the primary lobe. In a still preferred embodiment, the value of that angle is one-fourth the value of the lobe angle. Also in a preferred embodiment, the restrictive wall intercepts the sonic pattern in the first quadrant which is projected at an angle of at least fifteen (15) degrees from the primary direction of the primary lobe.

In a still preferred embodiment a protective wall is coupled to the end wall and the pair of side walls for protecting the sonic transducer from the elements. The interior face of the protective wall nearest the sonic transducer may be covered with a sonic energy absorbent material. The protective wall may have a lip at its most distal edge covering the edge of the sonic energy absorbent material. Further, in a preferred embodiment, a pair of curved surfaces may connect the pair of side walls with the restrictive wall. And in a still preferred embodiment, a transmissive wall allowing for the passage of sonic energy and providing physical protection for the sonic transducer may cover the open end of the housing.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENTS

Figure 1:
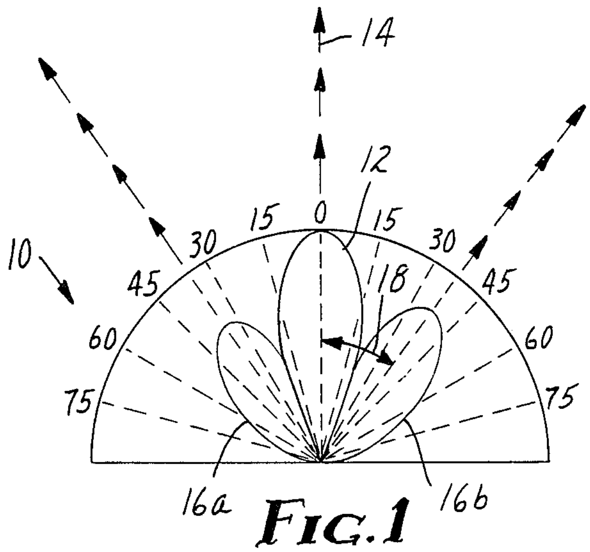
FIG. 1 is an illustration of the sonic pattern projected by a sonic transducer.

FIG. 1 illustrates a typical sonic pattern 10 projected by a typical sonic or ultrasonic transducer. The pattern includes a primary lobe 12 projected in a primary direction 14 and a secondary lobe **16*a* and 16*b* surrounding the primary lobe 12. The secondary lobe 16*a* and 16*b* is projected at an angle to the direction of projection of the primary lobe 12 or the primary direction 14. In this example, the secondary lobe 16*a* and 16*b* is projected at approximately 40 degrees with respect to primary direction 14. The angle of the secondary lobe 16*a* and 16*b* makes with the primary lobe (and more particularly with the primary direction 14) is defined herein as the lobe angle 18**.

Figure 2:
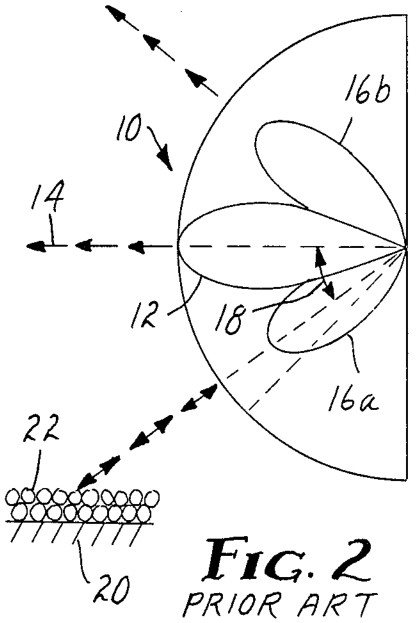
FIG. 2 PRIOR ART
FIG. 2 illustrates an example of unwanted ground return.

FIG. 2 illustrates the problem of unwanted ground return from a transducer mounted primarily to detect vehicle present at a distance above the ground. The sonic pattern illustrated again has a primary lobe projected in the primary direction and a secondary lobe **16*a* and 16*b*. Since secondary lobe 16*a* and 16*b* is projected at lobe angle 18 with respect to the primary direction 14, a portion of the secondary lobe 16*a* and 16*b*, namely that part represented by reference numeral 16*a* is projected toward the ground 20. The ground 20 may have an irregular surface such as may be formed with the pebbles in a pavement aggregate 22. Since the pavement aggregate 22 may be irregular, the secondary lobe 16*a*** may be reflected back to the transducer and indicate a false return and result in a false detection.

Figure 3:
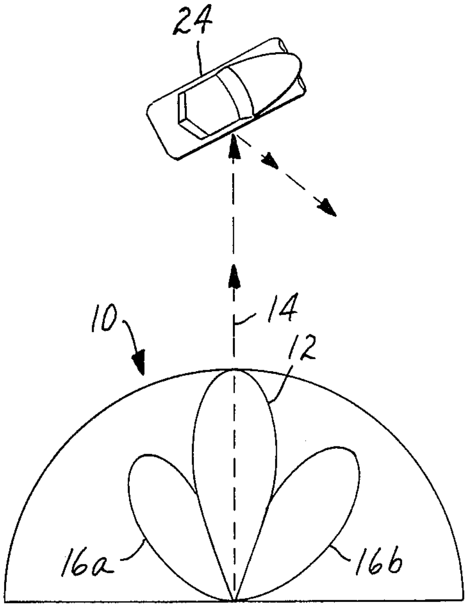
FIG. 3 PRIOR ART
FIG. 3 illustrates an example of a non-uniform coverage area.

FIG. 3 illustrates another problem with an echo-ranging object detection system utilizing a sonic pattern 10 of the type described. Again, in FIG. 3 a primary lobe 12 is projected in a primary direction 14 along with the secondary lobe **16*a* and 16*b*. In the illustration (obviously not to scale) an automobile 24 may be present in the surveillance area but angled slightly with respect to the transducer (not shown). Thus, the sonic pattern 10 projected in the primary direction 14 would be reflected back not directly to the transducer, but at an angle thereto and the automobile 24 may go undetected. Furthermore, an object could be located between the projection of the primary lobe 12 and secondary lobe 16** such that the sonic pattern would not impinge upon the object at all, and of course, not be reflected back to the transducer.

Figure 4:
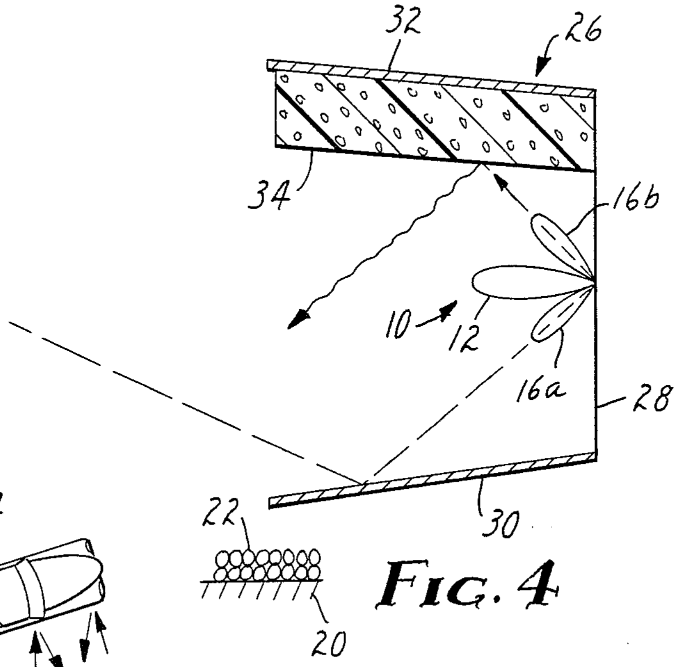
FIG. 4 is an illustration of the present invention solving the unwanted ground return.

FIG. 4 illustrates a solution to the unwanted ground return problem. Again, a sonic pattern 10 is illustrated having a primary lobe 12 and a secondary lobe **16*a* and 16*b*. Again, the portion of the secondary lobe 16*a* and 16*b* represented by 16*a* is projected toward the pavement aggregate 22 on the surface of the ground 20. However, in FIG. 4, a housing 26 encompasses part of the sonic pattern 10. The transducer (not shown) producing the sonic pattern 10 is mounted on an end wall 28. The housing also has a restrictive wall 30 (in this example the restrictive wall 30 is also the bottom wall) which intercepts the secondary lobe 16*a* and reflects the sonic energy away from the quadrant in which the restrictive wall 30 is located toward the opposite quadrant. Although not required, FIG. 4 also illustrates a protective wall 32 (in this example the protective wall 32 is also the top wall) which serves to protect the transducer producing the sonic pattern 10 from the elements. In certain circumstances, protective wall 32 may serve to re-introduce the ground return problem. In certain circumstances, secondary lobe 16 may be reflected from the protective wall 32 back toward the pavement aggregate 22 and produce the unwanted false ground return. To protect against this, a preferred embodiment of the present invention has a sonic energy absorbent material 34 covering the interior face of the protective wall 32 or covering that portion of the interior face of the protective wall 32** which presents a problem for unwanted ground return or other unwanted false returns.

Figure 5:
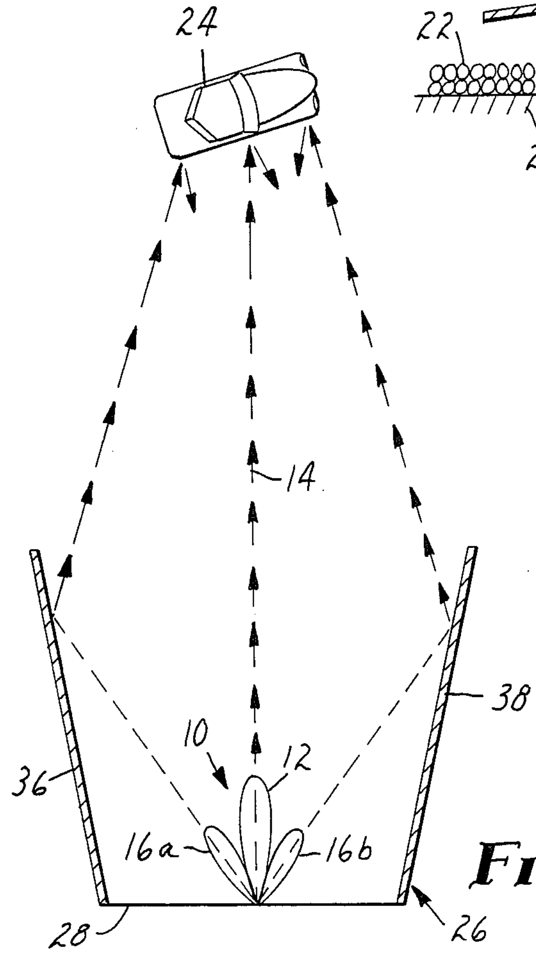
FIG. 5 is an illustration of the present invention solving the non-uniform coverage areas.

FIG. 5 illustrates the solution to the non-uniform coverage area described in FIG. 3. Again, as in FIG. 3 a sonic pattern is illustrated having a primary lobe 12 and a secondary lobe **16*a* and 16*b*. Again, an automobile 24 is positioned in the surveillance area in the primary direction 14. The sonic pattern projected by the primary lobe 12 impinges directly upon the automobile 24. The automobile 24, however, as illustrated in FIG. 3 is set at an angle with respect to the transducer (not shown) producing the sonic pattern 10. The housing 26 illustrated in FIG. 5 makes the sonic pattern 10 more uniform than the sonic pattern 10 illustrated in FIG. 3. The housing 26 again has an end wall 28 and a pair of side walls 36 and 38. The housing 26 makes the sonic pattern 10 in FIG. 5 more uniform for two reasons. First, the sonic pattern produced by the primary lobe 12 in a primary direction 14 impinges upon the automobile 24 and is reflected back at an angle with respect to the transducer creating the sonic pattern 10. Side wall 38 of the housing 26 may catch or collect the reflected wave form and reflect it to the transducer allowing a detection of the automobile 24 where a detection would not otherwise have been produced. Side walls 36 and 38 reflect secondary lobe 16*a* and 16*b* respectively, to "fill in" the sonic pattern to project sonic energy in an area which otherwise would not have had sonic energy impinging, and to allow sonic energy to impinge upon the automobile 24 at a different angle from that projected by the primary lobe 12. This function also may allow the detection of the automobile 24 where otherwise the automobile 24** might have been missed.

Figure 6:
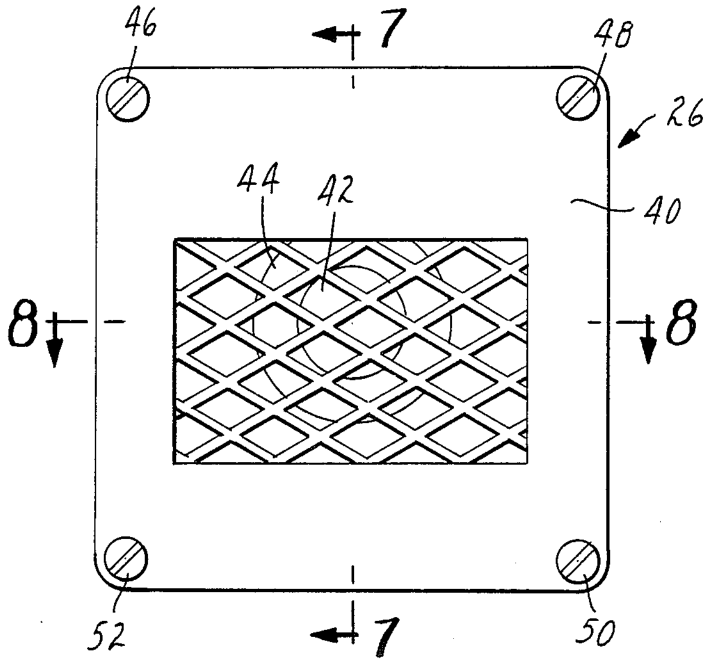
FIG. 6 is a front view of the housing with a cover attached.

FIG. 6 shows a front view of the housing with a transmissive wall (or cover) covering the open end of the housing 26. Visible through the transmissive wall 40 is the transducer 42 mounted to the end wall 28 with grommet 44. In FIG. 6 the sonic pattern 10 is being projected in a primary direction 14 directly out of the paper toward the observer. As illustrated in FIG. 6 the transmissive wall 40 allows the passage of sonic energy in both directions through it, or through a portion of it, while providing physical protection for the transducer 42. Screws 46, 48, 50 and 52 mount the transmissive wall to the rest of the housing 26.

Figure 7:
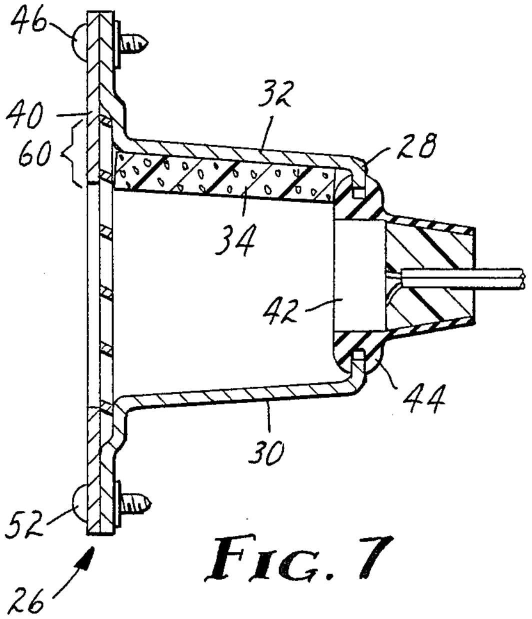
FIG. 7 is a cross-sectional view of the housing showing the top and bottom walls.

FIG. 7 is a cross-sectional side view of the housing 26 illustrating primarily the restrictive wall 30 and the protective wall 32 with respect to the transducer 42. Transducer 42 is mounted to the end wall 28 with grommet 44. Restrictive wall 30 is disposed with respect to the transducer 42 to intercept the secondary lobe 16 projected by the transducer 42 in the quadrant of projection which is in the quadrant in which limited reception is preferred (in a preferred embodiment, the bottom quadrant). The length and angle of the restrictive wall 30 is not crucial as long as it will intercept the secondary lobe 16 and reflect the secondary lobe 16 away from the quadrant in which restrictive wall 30 is located.

Protective wall 32, while not required, is desirable especially in an installation where the protective wall 32 becomes the top wall of the housing 26. The primary purpose of the protective wall 32 is to protect the transducer 42 from the elements such as rain, sleet, snow, etc. As stated with respect to FIG. 4, it is desirable that protective wall 32 not be the cause of unwanted reflections from the restrictive quadrant containing the restrictive wall 30. Thus, it is preferred that those portions of the protective wall 32 which may produce those unwanted reflections be covered with a sonic energy absorbent material 34. In a preferred example the sonic energy absorbent material 34 is a three-eighths inch (0.95 centimeters) thick polyurethane foam with an ester base having a two-pound density. Also illustrated in FIG. 7 is a transmissive wall 40 attached to the rest of the housing 26 with screws 46 and 52. The housing 26 may itself be constructed of any suitable fairly rigid material which will reflect sonic energy. A typical and suitable material would be plastic. The housing 26 illustrated in FIG. 7 is preferred to have a cavity which is 2.04 inches (5.18 centimeters) high and 2.25 inches (5.72 centimeters) deep (from the transmissive cover 40 to the end wall 28). It is preferred that the restrictive wall 30 intercept the secondary lobe 16, the sonic pattern 10 produced by the transducer 42 at any angle which is at least 15 degrees from the primary direction 14. The grommet 44 is preferably a rubber grommet of approximately 50 durometers. The restrictive wall 30 is angled slightly outward for the purposes of allowing any moisture accumulation to readily drain. In this preferred embodiment, a portion 60 of transmissive wall 40 forms a lip covering the edge of the sonic energy absorbent material 34. This lip effectively becomes part of protective wall 32 at its most distal edge from transducer 42 to provide a protection for the sonic energy absorbent material 34 at its outside edge.

Figure 8:
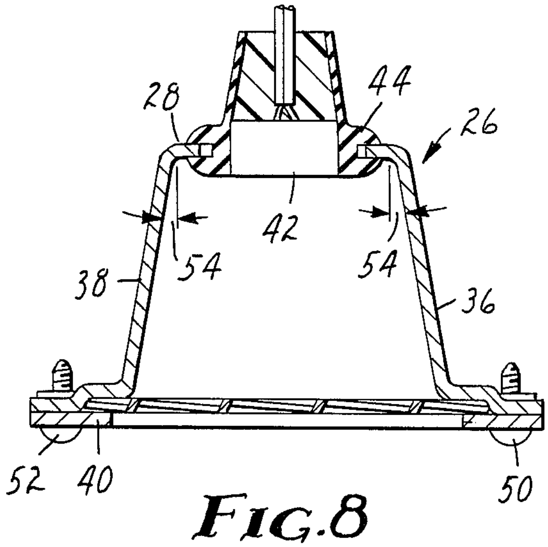
FIG. 8 is a cross-sectional view of the housing showing the side walls.

FIG. 8 is a cross-sectional view of the housing 26 primarily illustrating the orientation of side walls 36 and 38. Again, transducer 42 is mounted in the end wall 28 with grommet 44. Also, as previously illustrated, transmissive cover 40 covers the opening of the housing 26 and is mounted thereto with screws 50 and 52. Side walls 36 and 38 are disposed with respect to transducer 42 to intercept and reflect the secondary lobe 16. The reflections provided by the direct impingement of the secondary lobe 16 with side walls 36 and 38 produce a more uniform sonic pattern over the two quadrants in which side walls 36 and 38 are located. It is preferred that side walls 36 and 38 are angled slightly outward from the primary direction 14. In a preferred embodiment, it has been found that this outward angle is particularly crucial to the performance of the echo-ranging object detection system. Satisfactory results have been obtained with a side angle 54 having a value of from 0.2 to 0.3 of the angle which the secondary lobe 16 makes with the primary lobe 12, the lobe angle 18. In a preferred embodiment, the value of the side angle 54 is one-fourth of the lobe angle 18. Side walls 36 and 38 may be constructed of a material similar to that forming the rest of the housing 46, for example plastic, it being fairly rigid and capable of reflecting sonic energy. The cavity illustrated in FIG. 8 of the preferred embodiment has a height of 2.04 inches (5.18 centimeters) and a depth of 2.25 inches (5.72 centimeters) (again from transmissive wall 40 to end wall 28). In a typical embodiment the face of transducer 42 may be mounted approximately one-eighth of an inch (0.32 centimeters) inward from the interior surface from end wall 28. In a preferred embodiment, the lobe angle 18 of the sonic pattern 10 produced by the transducer 42 has a value of approximately 45 degrees. Thus, a side angle 54 of from 9.0 to 13.5 degrees would be acceptable. It s preferred that the side angle 54, in this example, be 11.25 degrees (one-fourth of 45 degrees).

Figure 9:
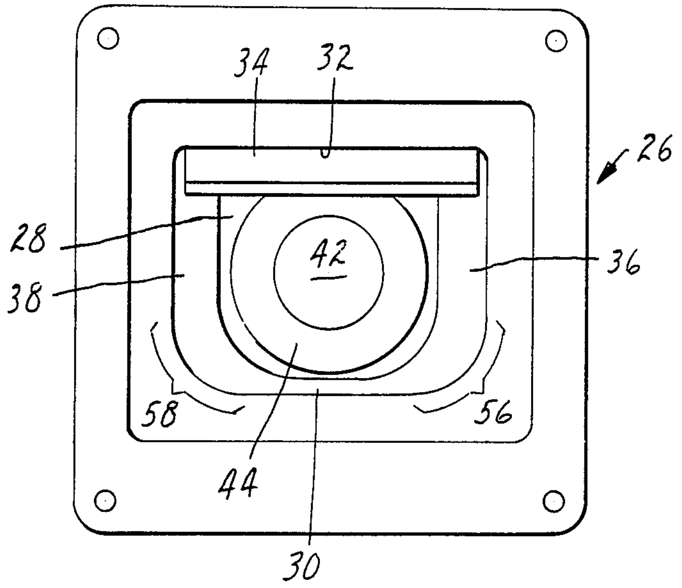
FIG. 9 is a plan view of the housing without a cover.

FIG. 9 is a plan view of the housing 26 without transmissive wall 40. Transducer 42 is shown mounted in grommet 44 and in end wall 28. Restrictive wall 30 is illustrated angled slightly to allow for moisture drainage. Side walls 36 and 38 are shown angled at the proper side angle 54. Protective wall 32 is also illustrated faced with sonic energy absorbent material 34. In addition, FIG. 9 illustrates another preferred aspect of the present invention. Curved surfaces 56 and 58 connect side walls 36 and 38, respectively, with restrictive wall 30 producing a "rounded corner". In the preferred embodiment, these curved surfaces 56 and 58 have a radii of 0.68 inches (1.73 centimeters). It has been found that the curved surfaces 56 and 58 further reduce sonic energy in the quadrant containing restrictive wall 30 and produce a more uniform sonic pattern in the adjacent quatrants.

While the housing 26 of the present invention may be utilized with any type of sonic transducer, it is recognized and preferred that an ultrasonic transducer 42 be utilized.

While the preferred embodiment illustrated in the present invention shows an orientation of the housing 26 such that the restrictive wall 30 is the bottom wall, it is recognized that other orientations of the housing are not only possible but may be desirable. Thus, it is to be emphasized that it is within the scope of the present invention that the housing 26 may be oriented such that the restrictive wall 30 is positioned in a direction other than the bottom of the assembly. In other embodiments the restrictive wall 30 may be preferred to be the top wall. Particularly in this arrangement, it is not necessary that the protective wall 32 be included.

While end wall 28 in the preferred embodiments has been consistently referred as a "wall", it is to be recognized and understood that the function of end wall 28 is to receive and support the sonic transducer 42. Any structure suitable for receiving and supporting a sonic transducer 42 is suitable and contemplated for the end wall 28. It is not necessary that the end wall 28 be a solid structure or that it reflect sonic energy. In particular supporting brackets coupled to one or more of the walls of the housing 26 (restrictive wall 30, side wall 36, side wall 38 or protective wall 32) are contemplated to be within the scope of the present invention.

Thus, it can be seen that there has been shown and described a novel housing for a sonic transducer. It is to be understood, however, that various changes, modifications, and substitutions in the form and details of the described invention can be made by those skilled in the art without departing from the scope of the invention as defined by the following claims.

What is claimed is:

1. A housing adapted for receiving a sonic transducer, said sonic transducer being capable of projecting and receiving a sonic pattern having a primary lobe in a primary direction and a secondary lobe over four quadrants, said secondary lobe being at a lobe angle to said primary lobe, comprising:

an end wall adapted for receiving said sonic transducer;

a restrictive wall coupled to said end wall, said restrictive wall for intercepting said secondary lobe in a first quadrant and reflecting said secondary lobe into a quadrant opposite said first quadrant; and a pair of side walls coupled to said end wall and to said restrictive wall, said pair of side walls substantially intercepting and reflecting said secondary lobe in quadrants adjacent said first quadrant to provide a more uniform sonic pattern in said quadrants adjacent said first quadrant to fill in said sonic pattern between said primary lobe and said secondary lobe in said quadrants adjacent said first quadrant;

said primary lobe of said sonic pattern being free of interception by said restrictive wall and said pair of side walls.

2. A housing as in claim 1 wherein said pair of side walls are disposed at a side angle outward from said primary direction having a value of from 0.2 to 0.3 of the value of said lobe angle.

3. A housing as in claim 2 wherein said side angle has a value of one-fourth of the value of said lobe angle.

4. A housing as in claim 1 wherein said restrictive wall intercepts said sonic pattern in said first quadrant which is projected at an angle of at least fifteen degrees from said primary direction.

5. A housing as in claim 1 further comprising a protective wall coupled to said end wall and to said pair of side walls, said protective wall for protecting said sonic transducer from the elements.

6. A housing as in claim 5 wherein said protective wall has an interior face nearest said sonic transducer, said interior face being covered with a sonic energy absorbent material.

7. A housing as in claim 6 wherein said protective wall further comprises a lip at its most distal edge, said lip covering the edge of said sonic energy absorbent material.

8. A housing as in claim 1 further comprising a pair of curved surfaces connecting said pair of said side walls with said restrictive wall.

9. A housing as in claim 1 which further comprises a transmissive wall opposite said end wall, said transmissive wall allowing for passage of sonic energy and providing physical protection of said sonic transducer.

10. A housing comprising:

an end wall adapted for receiving an ultrasonic transducer capable of projecting and receiving a sonic pattern having a primary lobe in a primary direction and a secondary lobe, said secondary lobe being at a lobe angle to said primary lobe;

a bottom wall intercepting said secondary lobe in a first quadrant and reflecting said secondary lobe into a quadrant opposite said first quadrant;

a pair of side walls substantially intercepting and reflecting said secondary lobe in quadrants adjacent said first quadrant to provide a more uniform sonic pattern in said quadrants adjacent said first quadrant; and a top wall providing said ultrasonic transducer with protection from the elements;

whereby said ultrasonic transducer has a restricted area of projection and reception in a quadrant defined by said bottom wall and more uniform area of projection and reception in quadrants defined by a pair of side walls to fill in said sonic pattern between said primary lobe and said secondary lobe in said quadrants adjacent said first quadrant;

said primary lobe of said sonic pattern being free of interception by said restrictive wall and said pair of side walls.

11. A housing as in claim 10 wherein said pair of side walls are disposed at a side angle outward from said primary direction having a value of from 0.2 to 0.3 of the value of said lobe angle.

12. A housing as in claim 11 wherein said side angle has a value of one-fourth of the value of said lobe angle.

13. A housing as in claim 10 wherein said bottom wall intercepts said sonic pattern in said first quadrant which is projected at an angle of at least fifteen degrees from primary direction.

14. A housing as in claim 10 wherein said top wall has an interior face nearest said ultrasonic transducer, said interior face being covered with an ultrasonic energy absorbent material.

15. A housing as in claim 14 wherein said top wall further comprises a lip at its most distal edge, said lip covering the edge of said ultrasonic energy absorbent material.

16. A housing as in claim 10 further comprising a pair of curved surfaces connecting said pair of side walls with said bottom wall.

17. A housing as in claim 10 which further comprises a transmissive wall opposite said end wall, said transmissive wall allowing for passage of ultrasonic energy and providing physical protection of said ultrasonic transducer.

* * * * *